Jan. 30, 1968  V. F. ZAHODIAKIN  3,365,998
INSERT WITH COLLAPSIBLE END
Filed May 4, 1966  2 Sheets-Sheet 1

INVENTOR.
VICTOR F. ZAHODIAKIN
BY Howard P. King
ATTORNEY.

Jan. 30, 1968  V. F. ZAHODIAKIN  3,365,998
INSERT WITH COLLAPSIBLE END
Filed May 4, 1966  2 Sheets-Sheet 2

INVENTOR.
VICTOR F. ZAHODIAKIN
BY
Howard P. King
ATTORNEY

United States Patent Office 3,365,998
Patented Jan. 30, 1968

3,365,998
INSERT WITH COLLAPSIBLE END
Victor F. Zahodiakin, Summit, N.J.; Tania Zahodiakin, administratrix of said Victor F. Zahodiakin, deceased
Continuation-in-part of application Ser. No. 540,664, Apr. 6, 1966. This application May 4, 1966, Ser. No. 554,255
4 Claims. (Cl. 85—70)

ABSTRACT OF THE DISCLOSURE

A hollow insert projecting through a receiving body and providing an end portion both internally and externally conical, opening at its smaller end with internal thread convolutions thereat conforming to other threads remote from said convolutions by which the conical end may be compressively folded or crumpled outwardly in place by a threaded stud screwed home, with said convolutions releasing engagement from the threads of the stud as the said conical end folds.

This application is a continuation-in-part of my prior application S.N. 540,664, filed April 6, 1966, now abandoned.

In its broad aspect, the invention proposes a longitudinally hollow insert headed with a flange at one end, said insert being constructed to be radially spread and crumpled at its other end by application of a longitudinally directed compressive force applied selectively by impact, by screwing a bolt or the like thereinto in place of use, or by other modes of accomplishment of desired formation, inclusive of employment of a tensioning tool.

Another object of the invention is to obtain tight rivetting of the insert without cracking or otherwise injuring the structural parts involved.

Another object of the invention is to provide such an insert, which, after mounting, provides a planar end face of materially greater radial width than the thickness of the insert wall.

Figure 1:
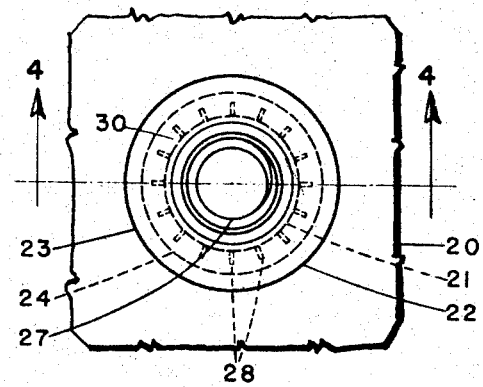
FIGURE 1 is a plan or top view of a threaded insert made in accordance with the present invention and mounted in place on a sheet-material basal member.
Figure 2:
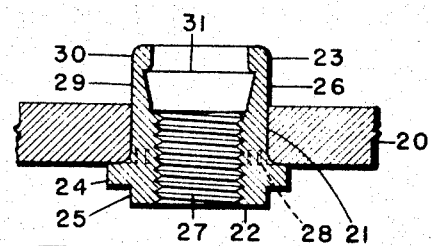
FIGURES 2 and 3 are sectional views similar to FIG. 4 and progressively showing initial formation and a partially applied formation of the threaded insert.
Figure 3:
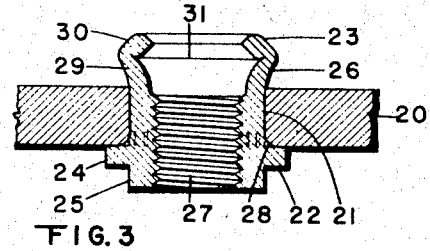
Figure 4:
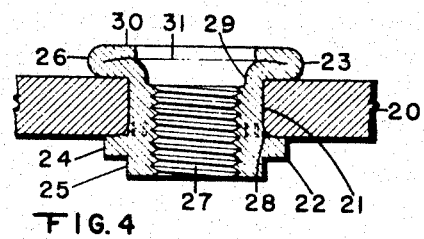
FIGURE 4 is a sectional view on line 4—4 of FIG. 1, showing the fully mounted condition of the threaded insert.

Referring initially to FIGS. 1–4, a construction is shown in conjunction with a basal member 20 of character too thin and/or too weak to have adequate threads formed directly therein of sufficient strength to hold a bolt or other threaded element securely. The problem has been, in this connection, to properly apply and securely hold an insert in a prepared hole 21 in the basal member to supply the screw threads needed at that particular location. The objective is accomplished by use of insert 22 which in the showing under present discussion comprises a device of a generally cylindrical character in the form of a sleeve 23 having a radially projecting flange 24 proximate to what will be termed for convenience the lower end of the sleeve. While the sleeve is an integral entity, it may be considered as comprising an internally threaded lower portion 25 and an upper unthreaded portion 26. The hollow of the unthreaded portion has adequate diameter to admit passage of a bolt or the like therethrough so that the threads of the bolt may be brought into mesh with the threads 27 of the device. Said flange accomplishes the purposes, one of which is to keep the threaded portion and the threads from becoming distorted, and the other of which is to provide a stop or shoulder for limiting the distance of insertion of the device and hold it securely from further upward movement or displacement.

In order to prevent rotation of the device, radially disposed fillet ribs 28 are provided between the sleeve and flange at the junction between the exterior of the sleeve and upper face of the flange. These ribs, viewed in radial direction, have a retcangular configuration. When the flange is forced into engagement with the undersurface of the basal member 20, the ribs will become embedded in the material of which that member is composed.

The upper unthreaded portion of the sleeve may be considered as providing two sections, of which the lower section 29 proximate to and emanating from the upper end of the threaded portion, is slightly longer than the upper section 30 of said unthreaded portion. At the intermediate location in the hollow of the sleeve where the two said sections meet, there is a peripheral restricted region of wall thickness of the sleeve less than the wall thickness of said sleeve both above and below said region. This difference in thickness is accomplished by an increase thereat of the diameter of the hollow of the sleeve, and in FIGS. 1–4 is situated at line 31 where the upper and lower sections meet. In the particular showing being described, the hollow of the lower section 29 is frustoconical with the larger end of the frustrum upward and in a plane represented by said line 31, and the upper section has its lower end circularly convex or curling outwardly to the diameter of the hollow of the upper larger frustrum end of the lower section at plane 31.

Figure 5:
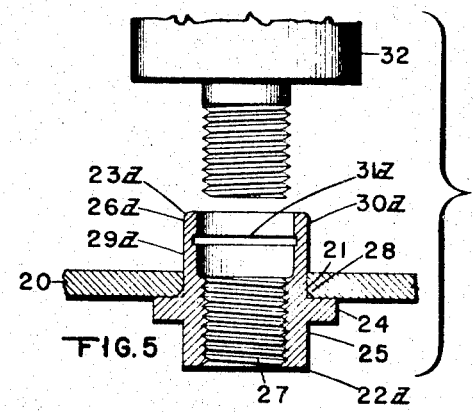
FIGURE 5 is another sectional view showing a modification of the threaded insert in its condition of formation and a tool by which it may be applied.
Figure 6:
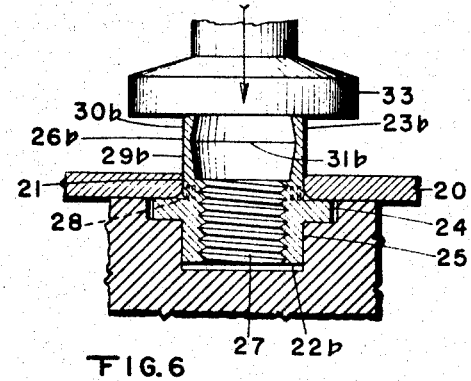
FIGURE 6 is another sectional view of a modification and associated tool for mounting the same.

In mounting the device in its appointed position the unthreaded end portion 26 is inserted through the hole 21 in the basal member 20 until the flange 24 engages substantially against the under side of said member. If the device is to be used as a rivet for two members, then of course said unthreaded end portion is pushed through registering holes of both members. Thereafter, the projecting unthreaded portion is bent or crumpled down, as by application of a threaded tool 32 as shown in FIG. 5, or by impact with use of a tool 33 such as shown in FIG. 6, or otherwise. In any event, the unthreaded sleeve portion dilates outwardly at the plane of the exit thereof from the member upper surface, and folds inwardly at the aforesaid region of restricted wall thickness at 31. The crumpling and bending is indicated as having begun in FIG. 3, and as completed in FIG. 4. The aforementioned convex lower end or curling of the wall surface of the hollow at said region 31 is conducive to a rolling action of the metal of the cylindrical section against the conical surface of the adjacent section obtaining a sharp and tight bend thereat so the two sections will be flattened together and so that both are caused to have extended areas with the flat area of the under one lying flatwise of the upper surface of the member marginally around the hole 21 and perpendicular to the axis of the hole and sleeve 23. Since the upper section was made shorter than the lower section, it will not interfere, in its crushed down condition with passage of a bolt to the threaded portion of the hollow. The said areas are parallel and relatively close to each other so the crushed sleeve has minimum protrusion above the surface of the member. The crushing obtains a very secure retention of the device in its appointed location.

Without elaboration, the modification of FIG. 5 will be readily understood from the foregoing description, noting that here, insert 22a in hole 21 of basal member 20 with a modified sleeve 23a has a flange 24, lower threaded portion 25 and threads 27 as above described. The upper unthreaded portion 26a differs, however, in that the lower and upper sections 29a and 30a both have cylindrical interior walls and the restricted region of wall thickness therebetween is effected by an interior peripheral groove 31a. Bending and crushing the sleeve of this modification will be in accord with the above description of FIGS. 1–4, and the final condition of the mounted insert 22a will be substantially as was shown in FIG. 4, with the fillet ribs 28 again preventing rotation and the tight gripping on the basal member preventing any longitudinal displacement and securely holding the insert in its appointed place. Crushing of the sleeve may be performed either by screwing threaded tool 32 into the insert or by applying an impact with the above-mentioned tool 33.

Correspondingly in FIG. 6, there is shown another modified construction of insert 22b in hole 21 of basal member 20, said insert, as before, having a flange 24, and fillet ribs 28 as well as a lower threaded portion 25. Here, however, the sleeve 23b provides an upper unthreaded portion 26b the interior of the wall whereof comprises lower and upper sections 29b and 30b both of which are frusto-conical with the frustrum larger ends situated next to each other and intermediate of the ends of said unthreaded portion. As as consequence, there is again a line or plane 31b at the junction of said sections representing a restricted region of wall thickness. Bending and crushing by such tools as 32 and 33 may be performed, thereby obtaining secure permanent holding of the insert in its appointed place.

Figure 8:
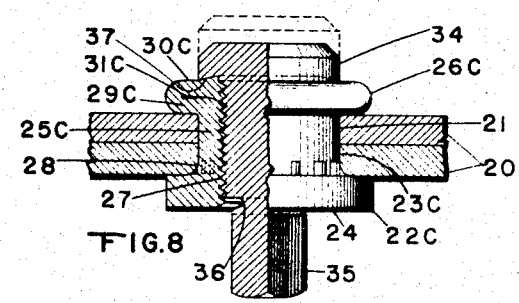
FIGURE 8 is a sectional elevation of the insert of FIG. 7, showing its application for rivetting two members together.

It will be understood from the showing in FIG. 8, that a plurality of basal members 20 may correspondingly be used in the disclosure of FIGS. 1–6. In all forms of the invention presented herein, the length of the threaded portion is made sufficient to provide for adequate convolutions of threads to meet the stress needs to be encountered in use. Thus in FIGS. 1–6 the sleeve extends an appropiate distance below the flange. However, with use of thicker basal members or with increased thickness resulting from use of superposed basal members 20, 20, as in FIG. 8, it may suffice to locate the flange 24 at the extreme end of the sleeve. Also in instances where the insert is needed only to rivet two or more members together, the stud 34, representative of more generally designated threaded tool, used to crush the sleeve, may or may not be left in the sleeve as found most expedient. Of course where the device is used for blind rivetting, the stud would have to remain, and to insert the stud head through the basal member to the blind side thereof, the stud head and sleeve would be of corresponding diameters to each other and obviously not greater than the diameter of hole 21, but closely equal thereto.

Figure 7:
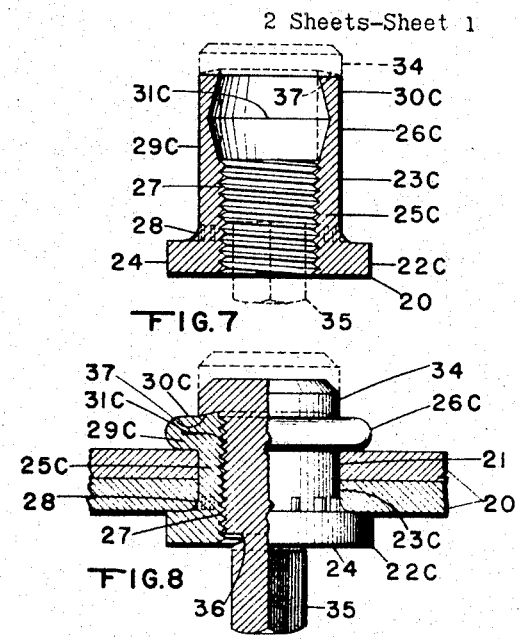
FIGURE 7 is a sectional view of a modified construction of the insert alone and of a character adapted for functioning as a rivet.

Illustrative of the facts stated immediately hereabove, FIGS. 7 and 8 show an insert 22c having a sleeve 23c somewhat longer than the sleeves previously illustrated herein, most of the increase in length being present in the threaded portion 25c, and said sleeve having a flange 24 at the extreme bottom thereof. The upper unthreaded portion 26c is composed of lower and upper internally conical sections 29c and 30c similar to the showing in FIG. 6. Other forms of upper unthreaded portion may be used. However, where it is proposed to leave the tool or stud 34 in the insert, it will be advantageous to make the upper section 30c at least as long as, or perhaps a trifle longer than, the lower section 29c, so that when crushing is completed, the edge of said upper section is compressed into the stud threads for locking the stud to permanently remain in the insert 22c.

In use, the stud 34 is first slid and screwed into the sleeve 23c and that assembly is then introduced through the holes 21, of basal members 20. The stud shank is long enough to project from the end of the sleeve when the stud head is seated at the opposite end of the sleeve, and that projecting end is squared or otherwise appropriately constructed to have a tool applied thereto for rotating the stud. The tool-receiving end of the shank is designated by numeral 35. As crushing progresses, the squared end of the stud progressively projects further and further from the insert 22c to a final position shown in FIG. 8. By providing the stud shank with a weakening peripheral break-off groove 36 at a location within the insert, the projecting end of the stud may be twisted off by application of force greater than that which was required to crush the upper portion 26c of the insert. This leaves the remainder of the stud in the insert, and represents use for blind rivetting. However, where access may be had to both front and back of the basal members, the insert of FIGS. 7 and 8 may be applied in the manner described previously in connection with FIGS. 1–6 and the insert threads made available for subsequent use.

Where, as with blind rivetting, the stud is twist-sheared and left in the insert, I prefer to annularly undercut the bolt head, as at 37 not only to better engage the end of the sleeve to bend the upper section 30c thereof inwardly, but also to exert a concentrated compressive bite into the metal of the sleeve, forcing metal both into the threads of the stud and into the undercut of the stud, thereby locking the stud securely in the insert so that it cannot vibrate, shake or otherwise become loose and objectionable.

Figures 9, 10:
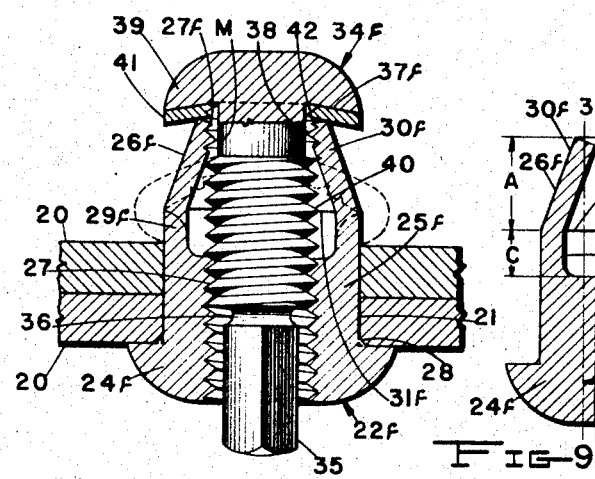
FIGURE 9 is a sectional view, partly in elevation, corresponding to FIG. 7, but showing a further modified construction of insert.
FIGURE 10 shows the insert of FIG. 9 internally threaded and in position in basal members to be rivetted together thereby with bending and crushing obtained by a permanently retained screw-bolt.

FIGURES 9–15 extend the showing of the invention to other embodiments, which, like that of FIGS. 7 and 8, are intended primarily for blind rivetting, although not necessarily limited thereto nor to rivetting only. FIGURE 9 shows the basic form of sleeve in its unthreaded condition, and in that form the insert may be used for blind rivetting as subsequently described in discussion of FIGS. 14 and 15. The hollow in said insert, may, however, be internally screw-threaded as has been done in FIGS. 10–12 thereby developing the major diameter indicated at D in addition to the original minor diameter M. Here, as in the showing of FIGS. 7 and 8, the lower end of the insert is provided with a head or flange 24f above which the insert has an exterior diameter corresponding to the size of hole 21 in basal members 20.

Figure 12:
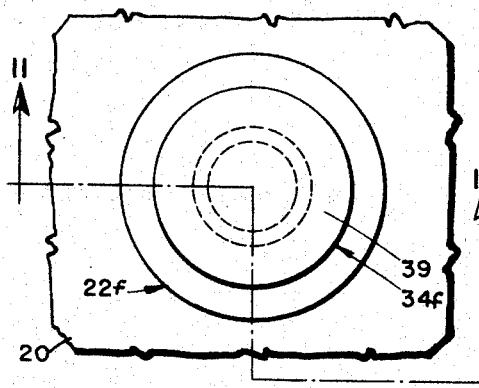
FIGURE 12 is a plan of FIG. 11.
Figure 13:
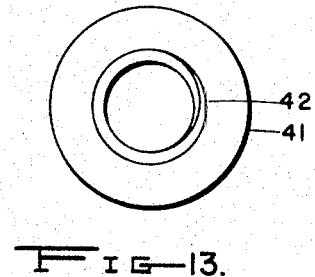
FIGURE 13 is a plan of the threaded bearing washer utilized in the modified construction included and illustrated in the modified construction of FIGS. 10–12.
Figure 11:
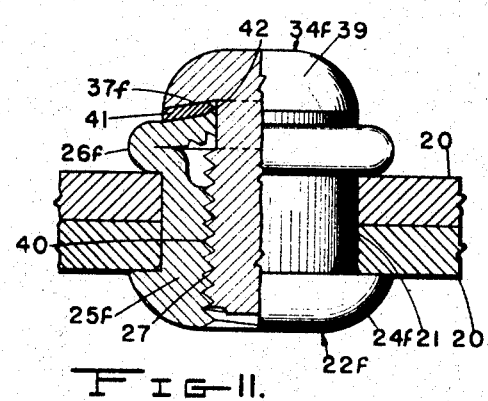
FIGURE 11 is a view showing the insert of FIG. 10 in its final rivetted condition, taken as a partial longitudinal section on line 11—11 of FIG. 12.

In general, as in previously described constructions, the insert 22f of FIGS. 10–12 provides a lower portion 25f and an upper portion 26f. Here the lower portion is tapped to provide internal screw threads 27 as before. The upper portion 26f provides a lower cylindrical section 29f of constant wall thickness the internal diameter whereof is greater than the major diameter D of the aforesaid threads 27. At the upper end of this cylindrical lower section 29f, as an integral continuation therewith, is an upper section 30f the wall whereof is of constant thickness and which converges inwardly upwardly in the form of a frustrum of a cone the upper end whereof has a circular opening 38 the diameter of which is that of the aforesaid minor diameter M. When tapping the lower portion 25f the tap is run through said opening producing one or more convolutions of threads 27f thereat. It may also be mentioned that the junction of the cylindrical section 29f with the tapered or frusto-conical section 30f establishes a crease-line or plane 31f where further bending will most readily occur in operation of crushing the two sections into flatwise engagement with each other and with the proximate surface of the basal member.

In preparation for mounting the device, a stud 34f, preferably specially formed, is screwed into said thread convolutions 27f in opening 38 and onward to and into aforesaid threads 27. Said stud provides a head 39 with an inwardly upwardly sloping undercut 37f extending to the stud shank. It is to be specially noted that the stud threads 40 terminate short of said undercut and that the stud shank between the stud head and the ending of the threads, has a diameter corresponding to the minor diameter M of said threads. Thus when the stud is screwed home, its threads and the thread convolutions of said opening no longer intermesh, but the thread peaks of the convolutions in the opening engage against the unthreaded surface of the shank.

To crush the upper section of the sleeve by rotation of the stud, high torque has to be applied and very high pressure develops. As it is not practical to employ hardened stud and insert, gouging and disruption of normal materials therefor will result with direct twisting engagement of the stud head in the sleeve end. To avoid such an adverse contingency, I provide a bearing washer 41 therebetween of hardened material, such as spring steel. Said washer is sloped toward its hole agreeable to the slope of the undercut 37f of the stud head. The hole of said washer is also threaded as at 42 to conform to the stud threads and thus the washer also hugs the unthreaded surface of the shank as shown in FIG. 10. The applied pressure consequently is against the hardened washer and close to the stud shank, and the crushed down upper end of the conical section remains close to the shank and in ultimate position frictionally grips the same. In order to promote the gripping action just mentioned, the height A of the conical section is made greater than the height C of the cylindrical section in a ratio of two to one. At this time, it may also be pointed out that the angularity of the conical wall to the axis has been determined by extensive experiment to also be critical and must be within the range of 10° to 30° and for best results I have found an angularity of approximately 20° obtains an excellent product.

As crushing progresses, the pressure is transmitted through the hardened washer to the conical section of the sleeve, and due to its angularity to the cylindrical section, and straight-line forces produced, the sleeve bends outwardly and doubles upon itself at crease-line 31f and the two sections are flattened down to a tight bulge with the said sections ultimately constituting layers intimately engaging each other and intimately engaging the proximate face of the basal member with the intimate engaging surfaces perpendicular to the axis of the insert and having radial projection substantially as great as the radial projection of the insert flange or head. By virtue of the layers of the buge thus created being in intimate contact with each other and by virtue of the extensive overlap and intimate contact on the basal member, great strength is obtained and permanence of the rivetting is assured.

As described in connection with the stud employed in the showing of FIGS. 7 and 8, the lower end of the said stud 34f shown as used in FIG. 10, may likewise have a projecting tool-receiving end 35 and a twist-off groove 36. It also follows that with the rest of the stud remaining in the insert, added strength and security will result.

Figure 15:
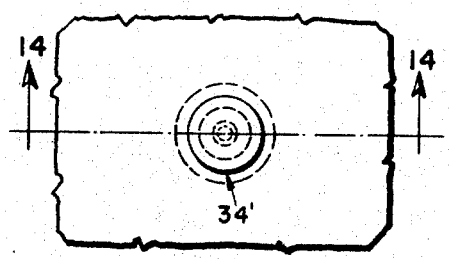
FIGURE 15 is a plan of the insert and basal member of FIG. 14.
Figure 14:
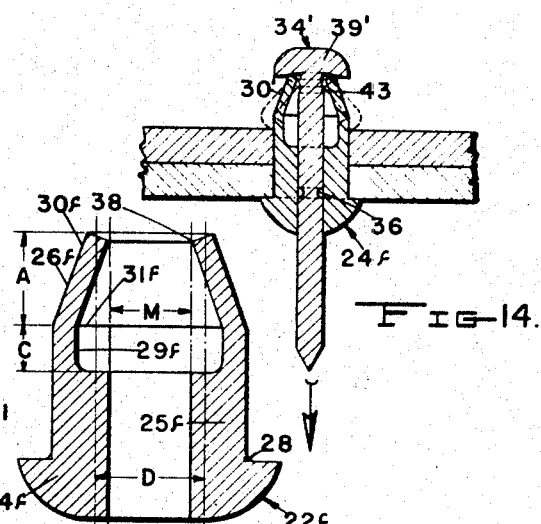
FIGURE 14 is a sectional view of the insert of FIG. 9, as on line 14—14 of FIG. 15, showing the insert used without screw-threads.

The showing in FIGS. 14 and 15 utilizes the unthreaded basic construction of insert shown in FIG. 9. The mode of application thereof is, as before, by means of a pressure applied to the conical upper section 30' producing a bulge of double thickness as the final result having the same appearance, function and utility above described with respect to proceding figures of the drawings. In this arrangement, the pressure is applied by exerting a pull on a slidable stud 34' the head 39' whereof has a sloping undercut. The stem or shank of the stud projects below the insert head or flange 24f to be grasped by a suitable tool which will exert a pull thereon and at the same time push against the insert. The said shank also is equipped with a break-off groove 36 agreeable to previous description, to eliminate the excess portion of the shank after it has served its purpose. If so desired, the remaining headed portion of the stud may be secured in place by providing it with peripheral teeth 43 immediately below said head into which the upper edge of the conical section will embed during the crushing operation.

In retrospect, I wish to point out that in all showings herein, the lower section of the upper portion of the sleeve makes a right-angular bend at the proximate surface of the basal member where projecting therefrom, and lies with an extended area flatwise marginally around the hole. This obtains a tight and permanent gripping action on the basal member and presents no possibility of being wedgingly drawn back through the hole, and thus obtains a secure and permanent retention of the insert in the basal member. Except in the construction of FIGS. 14 and 15 where rotation is not involved, means to prevent rotation, such as the above-described ribs 28 will be provided in all forms of the invention. Furthermore it is to be observed that in all forms of the invention, a crease-line is created at the inside of the sleeve of a character that will promote bending and doubling of the sleeve thereat to product two layers of the material crushed together into intimate contact.

I claim:

1. A device of the character described, comprising a cylindrical insert providing a sleeve with upper and lower end portions longitudinally thereof, said sleeve and end portions thereof having a hollow longitudinally therethrough with the hollow at said upper end portion of said sleeve being of generally greater interior diameter than the interior diameter of the hollow in the said lower end portion, the entire upper end portion comprising two sections and interiors whereof meet peripherally at an interior angle thereby having thereat an interior crease-line intermediate of the ends of said upper portion, said upper section being interiorly frusto-conical and opening upwardly at its smaller end and having thread convolutions in said smaller upwardly opening end, both of said sections of the upper portion bending in their entireties radially outwardly as a lateral bulge upon crushing said upper end portion, said crease-line defining line of bend at the maximum projection radially of the bulge, and said end sections thereby constituting juxtaposed layers projecting radially outward to said crease-line.

2. A device in accordance with claim 1, wherein said lower portion is threaded with the threads conforming to said thread convolutions in said smaller upwardly opening end and on a common axis therewith.

3. A device in accordance with claim 1, wherein said lower portion is threaded, and wherein a stud is screwed through the thread convolutions of said upwardly opening end of the upper portion into the threads of said lower portion, and wherein said stud has a head engaging and adapted to crush said upper section, said stud head having an upwardly inwardly sloping undercut overlying the upper end of said upper section.

4. A device in accordance with claim 1, wherein said stud is threaded at its end away from the head and unthreaded proximate to said head and having thereat a diameter conforming to the minor diameter of said stud threads, and wherein said upper conical section of the sleeve slopes under said head and has its threaded convolutions in its opening thereat, said convolutions having a minor diameter which conforms to the diameter of said unthreaded part of the stud proximate to said head.

References Cited

UNITED STATES PATENTS

| | | | |
|---|---|---|---|
| 2,026,757 | 1/1936 | Swanstrem | 151—41.72 |
| 2,030,166 | 2/1936 | Huck | 85—70 |
| 2,030,167 | 2/1936 | Miller | 85—70 |
| 2,114,493 | 4/1938 | Huck | 85—78 |
| 2,432,949 | 12/1947 | Thorngren | 85—77 |
| 2,525,117 | 10/1950 | Campbell | 85—77 |
| 3,107,572 | 10/1963 | Orloff | 85—70 |
| 3,203,303 | 8/1965 | Laisy | 85—77 |
| 3,270,793 | 9/1966 | Pdmon | 85—70 |
| 3,302,510 | 2/1967 | Gapp | 85—77 |

FOREIGN PATENTS

| | | |
|---|---|---|
| 418,914 | 11/1934 | Great Britain. |
| 625,331 | 6/1949 | Great Britain. |

MARION PARSONS, Jr., *Primary Examiner.*